(12) United States Patent  (10) Patent No.: US 8,844,565 B2
Wirth  (45) Date of Patent: Sep. 30, 2014

(54) BAFFLE FOR HYDRAULIC RESERVOIR

(75) Inventor: Adam Wirth, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 13/251,209

(22) Filed: Oct. 1, 2011

(65) Prior Publication Data

US 2013/0081708 A1 Apr. 4, 2013

(51) Int. Cl.
| | | |
|---|---|---|
| B65D 90/52 | (2006.01) | |
| B65D 25/04 | (2006.01) | |
| B60P 3/24 | (2006.01) | |
| F15B 1/26 | (2006.01) | |
| F15B 21/04 | (2006.01) | |
| B62D 5/06 | (2006.01) | |

(52) U.S. Cl.
CPC . B62D 5/062 (2013.01); F15B 1/26 (2013.01); F15B 21/044 (2013.01)
USPC ............ 137/582; 137/574; 137/576; 220/563

(58) Field of Classification Search
USPC .................. 137/574, 576, 550, 582; 220/563
See application file for complete search history.

(56) References Cited

U.S. PATENT DOCUMENTS

| | | | | |
|---|---|---|---|---|
| 4,343,697 | A * | 8/1982 | Miller et al. ..................... | 210/90 |
| 6,568,556 | B1* | 5/2003 | Kahler et al. .................. | 220/563 |
| 2008/0173362 | A1* | 7/2008 | Wong et al. ..................... | 137/574 |
| 2009/0211552 | A1* | 8/2009 | Prior et al. ................. | 123/196 R |

* cited by examiner

Primary Examiner — Atif Chaudry
(74) Attorney, Agent, or Firm — Joseph E. Root

(57) ABSTRACT

An anti-vibration system for a fluid reservoir. The system includes a baffle disposed within the fluid reservoir. The baffle includes a mounting mechanism and one or more apertures. The mounting mechanism is adapted to mount the baffle within the reservoir. In addition, and a reservoir cover, enclosing the fluid reservoir, includes receiving fixtures to receive the mounting mechanism.

2 Claims, 4 Drawing Sheets

BAFFLE FOR HYDRAULIC RESERVOIR

BACKGROUND

This application relates generally to vehicular steering systems and more particularly to hydraulic reservoirs within steering systems.

Various components of the steering systems work in tandem for maintaining acceptable steering operational conditions in vehicles. Power steering systems are commonly employed in vehicles to assist drivers in steering maneuvers. Importantly, steering systems employing hydraulic fluids have been widely accepted and applied in modern vehicles.

Motor sports activities are often run on harsh terrain, placing considerable loads on vehicle components, and particularly on steering systems. In such extreme conditions, power steering systems undergo a wide variation in levels of stress and temperature. Those conditions can result in degraded operating characteristics and possibly an eventual breakdown.

During such off road racing events, hydraulic fluid reservoirs are subjected to high vibrational stresses, which could often exceed 20G of vertical force. Such stresses can cause fluid in the reservoir to move and splash violently, entraining air bubbles in the liquid and possibly causing gaps in the fluid flow itself. In either event, the result is air ingested in the steering system hydraulic lines, which interferes with steering performance Specifically, the presence of air in the hydraulic lines could result in steering pump cavitation, leading to a noticeable whining sound, momentary loss of steering assist, and a corresponding increase in the pump's internal temperature. Such operational conditions eventually could lead to a catastrophic failure of the steering system, rendering it inoperative.

The only way to accomplish an air removal in such cases is through a "vacuum pull" mechanism, which calls for evacuating the air and then refilling the system with hydraulic fluid. The solution, however, cannot be accomplished during dynamic operation of the vehicle, meaning service is required before returning to normal operation.

Moreover, the hydraulic fluid reservoirs currently employ a top cover design that allows any pressure build-up resulting from the expansion and contraction of the fluid to be released. This vented cover design however, cannot prevent the system the sloshing fluid from leaking out of the fluid reservoir. Currently, no system, apparatus, or solution is known or applied to address the issue of fluid sloshing within the hydraulic steering fluid reservoir at extreme vehicle maneuvers. In light of the scenario noted above, it would be highly desirable to have a system that inhibits the hydraulic fluid splashing and efficiently maintains the liquid within the confines of the reservoir. Importantly, an optimal solution to this problem also lies in employing a system which is independent from all energy requirements and is simple in construction and assembly.

SUMMARY

One embodiment of the present disclosure describes an anti-vibration system for a fluid reservoir. The system includes a baffle mounted within the reservoir through a mounting mechanism. One or more apertures are disposed on the surface of the baffle to provide a flow path for an incoming fluid flow. In addition, a reservoir cover adapted to enclose the fluid reservoir includes receiving fixtures to receive the baffle's mounting mechanism.

Certain embodiments disclose an anti-vibration system for a fluid reservoir, the system comprising a baffle mounted within the reservoir. Apertures are formed on the baffle surface forming a flow path for an incoming fluid flow. At least one suspension member extending upwards from the baffle, mounts the baffle within the reservoir. Each suspension member includes a mounting fixture at its tip remote from the baffle.

Another embodiment describes an anti-vibration fluid reservoir system that comprises an anti-vibration baffle disk mounted within the fluid reservoir through suspension members. The suspension members are formed as structures extending upwards from the disk with each suspension member including a mounting fixture at its tip remote from the disk. Pluralities of apertures formed on the baffle disk provide a flow path for an incoming fluid flow. A reservoir cover is adapted to enclose the fluid reservoir, and includes receiving fixtures adapted to receive each suspension member mounting fixture.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a system for providing the reservoir of a hydraulic steering system with a mechanism to dampen fluid vibration and sloshing during travel. This result is attained by maintaining the fluid level below the fill line at all times. To this end, a disk shaped baffle is disposed within the reservoir, adhering to the shape and size of the inner walls and protecting the fluid from undesired vibrations. Attachment fixtures or suspension members disposed at the periphery of the baffle assist in an optimal positioning of the baffle within the fluid reservoir. The baffle fastens either to the inner sidewalls via attachment fixtures or to the top cover through suspension members, rests above the surface of the fluid, at the fill line separating the air volume from the fluid volume. Apertures included in the baffle enable the incoming fluid to flow past the baffle and refill the reservoir during working cycles.

Exemplary Embodiments

Figure 1:
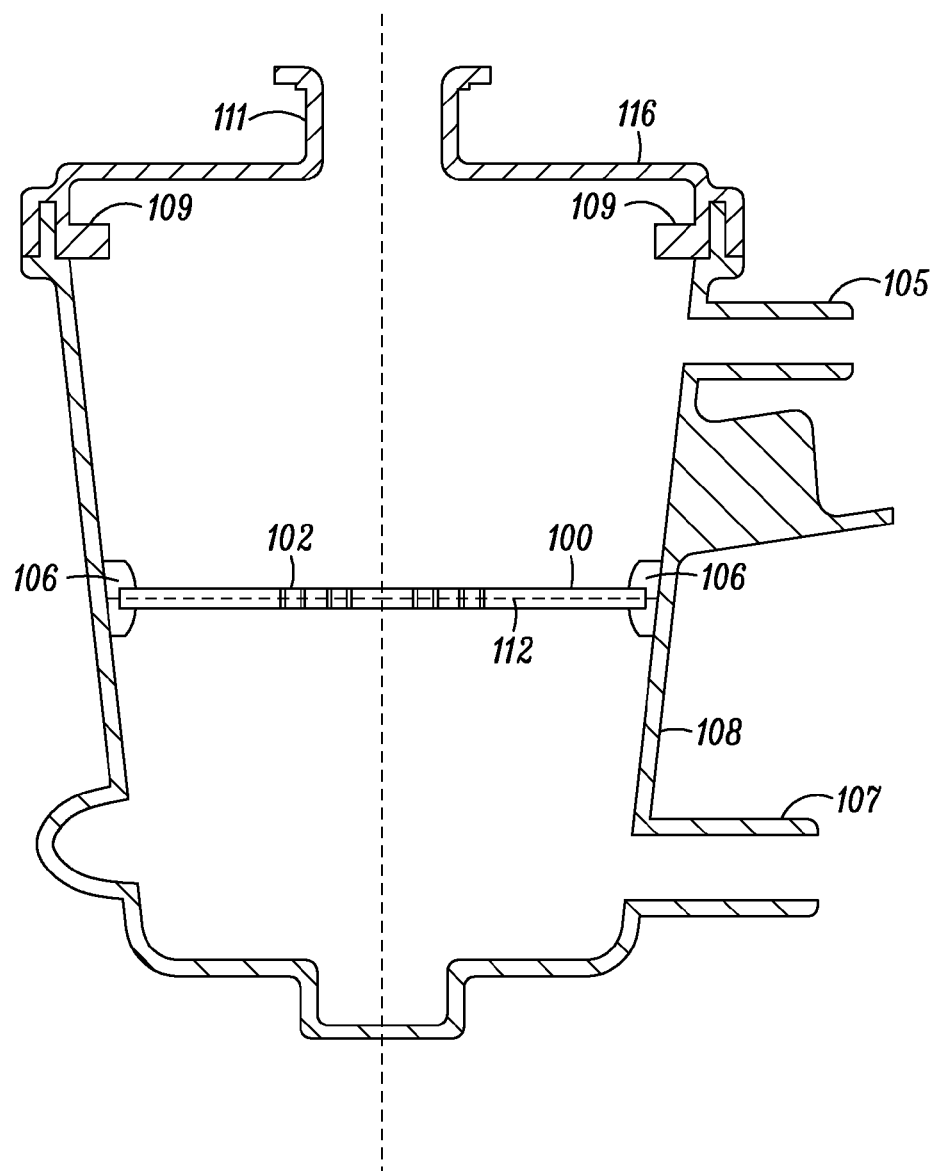
FIG. 1 illustrates an exemplary hydraulic steering reservoir employing an anti-vibration baffle mounted on the inner walls of the reservoir.

FIG. 1 illustrates an exemplary anti-vibration baffle 100 installed in a hydraulic fluid reservoir 108. The illustrated reservoir is positioned in the power steering system of an automobile, but the principles employed here can easily be transferred to other hydraulic systems of automobiles or similar vehicles, such as the brake system, or to cognate hydraulic systems in other applications entirely, such as heavy equipment. Fluid reservoir 108 includes input port 105 and output ports 107 for storing and dispensing the fluid employed in the power steering system, respectively. Further, a reservoir's vented top cover 116, comprising receiving fixtures 109 on the underside, both closes the reservoir 108 to retain fluid and provides a vent 111 to preclude pressure buildup resulting from thermal expansion or contraction.

An anti-vibration baffle 100 is positioned within the reservoir, approximately at the fluid fill line 112. This element is formed to fit into reservoir 108 with only slight clearance around the sides, and thus the illustrated baffle is generally circular. In reservoirs shaped to fit a given space, for example, the baffle would be designed accordingly. Further details of the baffle structure are set out below.

Baffle 100 is positioned within the reservoir 108 by snap attachment 106. That attachment includes fixtures on both the baffle 100 itself and the reservoir wall. Details of the attachment are well understood in the art and need no further elaboration here. A number of other positioning arrangements could be employed, with some examples being set out below and others left to the those in the art, who are capable of adapting conventional techniques to particular applications.

A function of baffle 100 is to separate the air volume carried within the upper portion of reservoir 108 from the hydraulic fluid in the lower portion. On one hand, positioning the baffle 100 below the fluid level could create a volume of fluid that remains floating over the surface of the baffle 100 most of the time. When encountering severe vibration and bouncing, the "floating" volume of fluid would remain free to slosh violently, exactly the condition that the baffle is designed to prevent. On the other hand, placing the baffle 100 too far above the expected fluid level can create other difficulties. If the baffle 100 lies too far above the fluid, the free volume thus defined may allow the fluid to slosh sufficiently to ingest air into the fluid, posing the problem of hydraulic pump cavitation discussed above. It has been found that prevention of air ingestion requires that the clearance between the baffle and fluid be restricted to 5 mm or less.

Accordingly, the baffle 100 is optimally positioned right at the fill line 112. Such a placement of the baffle 100 enables control of the fluid housed within the fluid reservoir 108, even when the vehicle is subjected to extreme driving conditions. This positioning of the baffle 100 allows a reduction in vibrational inefficiencies and volumetric imbalances, and thereby reducing the ingestion of air at the outlet and inlet ports of the fluid reservoir 108. Further, such an arrangement also leads to freedom from the dependence of energy for a "vacuum pull" or any other similar mechanism that may be needed for the evacuation of air that may escape into the system lines.

The anti-vibration baffle 100, may be made from a high grade plastic, such as polymers of nylon, nylon-6 or similar materials. In all configurations the material should be non-reactive to hydraulic fluids, a characteristic of the materials listed above. Forming the baffle 100 from the same material as that of the fluid reservoir 108 would offer advantages in manufacturing.

Figure 2A:
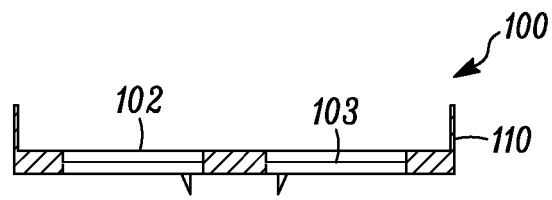
FIG. 2A is the side view profile of the exemplary anti-vibration baffle comprising meshed structures.
Figure 2B:
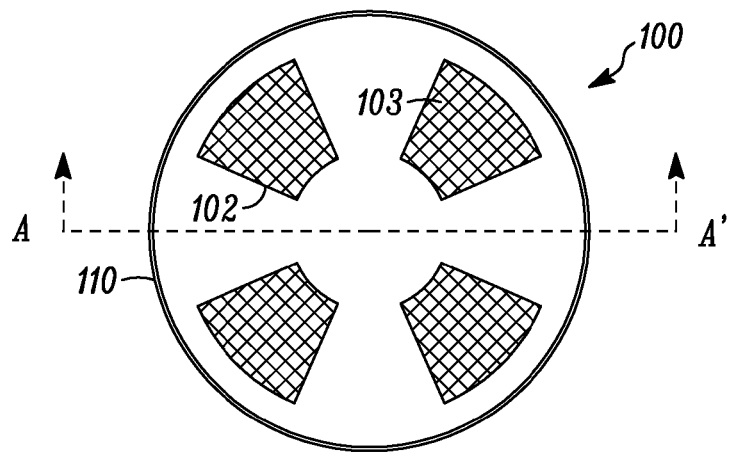
FIG. 2B is the top view of the anti-vibration baffle of FIG. 2A.

Fluid "splash-back" during reservoir filling can be avoided through the incorporation of apertures 102 in the disk shaped baffle 100, as seen in FIGS. 2A and 2B. There, sets of apertures 102 are formed in the baffle 100, enabling the fluid to flow through. One can thus fill the reservoir by adding fluid until the level reaches the fill line 112.

Apertures 102 are sized to balance the user's ability to fill the reservoir against the baffle's ability to restrain sloshing. Larger apertures would lead to a better flow-through, and thus improved filling, but larger apertures also increase the likelihood of the fluid sloshing. Similarly, smaller apertures would restrict sloshing to a greater extent, but the reduced flow rate may also restrict the ability to fill the reservoir 108.

One embodiment's solution to that design problem, apertures 102 of FIG. 2B, takes the form of openings formed in the surface of baffle 100. A mesh 103 overlies each aperture 102. Here, each aperture is a generally a fan-shaped opening, with four apertures spaced equidistantly around the baffle 100. That configuration allows a relatively large amount of fluid flow into the system, allowing the steering unit to work smoothly under heavy load applications. The filter meshes 103 could be made from a different material such as stainless steel, fixed to the baffle by an appropriate method, such as adhesive. Alternatively, the mesh 103 could be integrated into the same mold as the baffle 100.

Figure 3A:
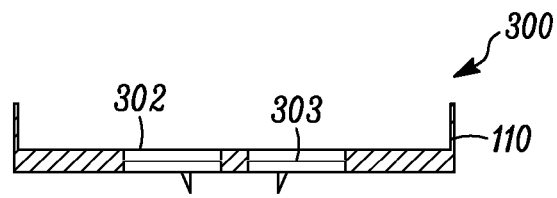
FIG. 3A is the side view profile of a second embodiment of an anti-vibration baffle comprising meshed structures.
Figure 3B:
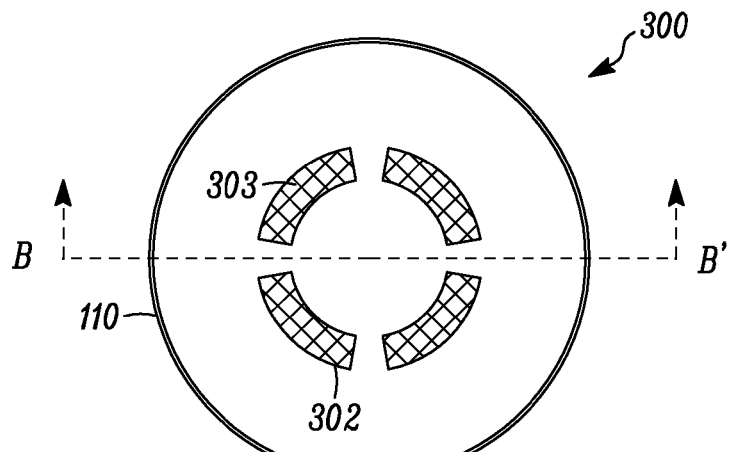
FIG. 3B is the top view profile of the anti-vibration baffle of FIG. 3A.

An alternate disk shaped baffle 300 having different apertures 302 is shown in FIGS. 3A and 3B. Here, the apertures 302 and meshes 303 are similar in construction to those provided in FIG. 2A and 2B, but apertures 302 and meshes 303 are smaller than the earlier-discussed apertures 102. These smaller apertures allow relatively lesser fluid to flow through the baffle 300 during, but enable a more positive restriction of fluid sloshing within the fluid reservoir 108.

Figure 4A:
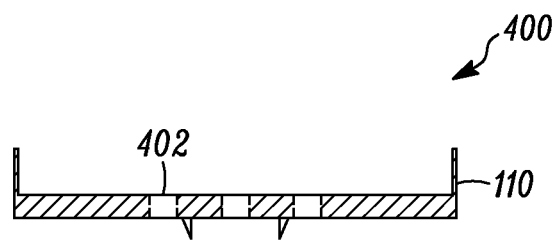
FIG. 4A is the side view of a third embodiment of an anti-vibration baffle comprising a plurality of apertures.
Figure 4B:
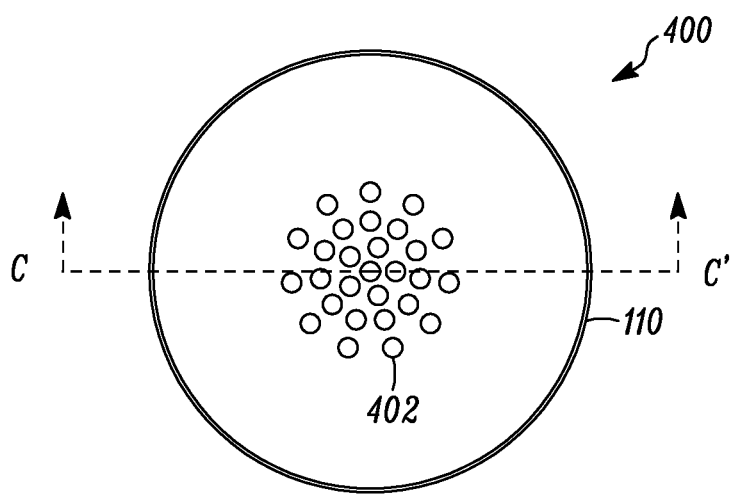
FIG. 4B is the top view of the anti-vibration baffle of FIG. 4A.

A positive control and restriction of the fluid can also be maintained through a standardized configuration of the baffle 400, in which a number of smaller apertures 402 are positioned randomly about the center of the baffle 100. One such embodiment is depicted in FIGS. 4A and 4B, with about 28 holes around the center of the baffle, with each hole having a diameter of not more than 3 mm. Such an anti-vibration baffle 400 is easier to manufacture and can universally be assembled into hydraulic steering fluid reservoirs.

Alternatively, the anti-vibration baffle 100 can be made to move vertically. A baffle 100, vertically movable, can adapt its position automatically to the varying quantities of fluid entering and leaving the fluid reservoir 108. Accordingly, vertical female slots can be internally provided along the wall of the reservoir 108 that could house the male members of the baffle 100, thereby assisting and guiding in its periodical reciprocating movements. Through the incorporation of such a feature, it will be understood that the management of variations in the reservoir fluid quantity would be more easily carried out. In such a configuration the baffle 100 may vary its position vertically in relation to the fluid reservoir 108 and may not rest at the fill line 112 at all times. Also, the baffle 100 in this case need not be provided with any externally powered agents or measures for its reciprocating movements, and can in turn be adapted to function independently.

It will be understood that any system or apparatus shaped and sized similar to the disclosed anti-vibration baffle 100, mated internally and assembled to the confines of the boundary of the fluid reservoir 108, as described above, would be able to attain the objectives of the disclosed system and would fall within its scope.

Figure 5:
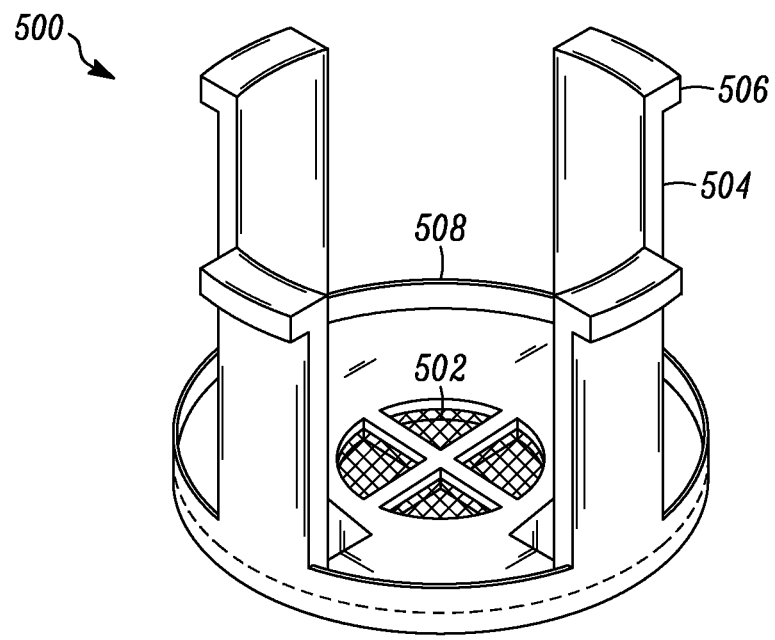
FIG. 5 illustrates an isometric view of an exemplary anti-vibration baffle with mountable support legs.

FIG. 5 illustrates an exemplary anti-vibration baffle 500 with four suspension members 504, positioned at the baffle periphery. For conformations wherein the walls of the fluid reservoir 108 are required to be free from all slots, grooves, and snap members, such a mounting mechanism can suitably be accommodated. Suspension members 504 are support legs extending upward from the baffle 500, and they function to mount the baffle 500 in an alternate fashion within the fluid reservoir 108. Suspension members 504 could be mounted to the top of the reservoir 108, by being snapped to the underside of the fluid reservoir vented top cover 116. The number of suspension members 504 employed with the baffle 500 may be varied according to the structural requirements and configurations of the fluid reservoir 108. Even though such a mounting mechanism offers the flexibility of mounting the baffle 500 differently, baffle 500 remains positioned at the fill line 112.

Suspension members 504 are configured as support legs, and they may include mounting fixtures 506 at their tips. This arrangement would allow the baffle 500 to be snapped into receiving fixtures 109 disposed at the underside of the top cover 116. Such a configuration can be particularly useful when the assembly and disassembly of components within a vehicle is of paramount importance and is regularly performed for short durations, for example in sporting or motor vehicle racing events.

In an alternate embodiment, the suspension member 504 may be mounted in an opposite direction where the legs extend downward and are fixed onto the bottom surface of the reservoir 108. To this end, the bottom inner surface of the reservoir 108 may include receiving fixtures that allow the suspension member 504 to be fastened to the bottom of the reservoir 108, as desired.

In another embodiment, baffle 500 may also be provided with a lip 508 running around the circumference of the baffle 500, and may be positioned on the fluid receiving side of the baffle 500. The lip 508 is a miniature wall, preferably not more than 3 mm high, and it may be manufactured as an integral part of the baffle 500. The baffle 500 along with the lip 508 may alternatively function as a "catch cup" or a filter cup for catching foreign objects, debris, small rock pieces, large sized dust particles, etc., that may get introduced into the system while the fluid is being added to the fluid reservoir 108. Such a structure would be similar to a strainer and would minimize any foreign particles from being introduced into the system lines, preventing system failures resulting from a component jam or an ineffective work output. Importantly, this feature enables foreign objects to be easily removed from the system during maintenance or repairs.

Figure 6:
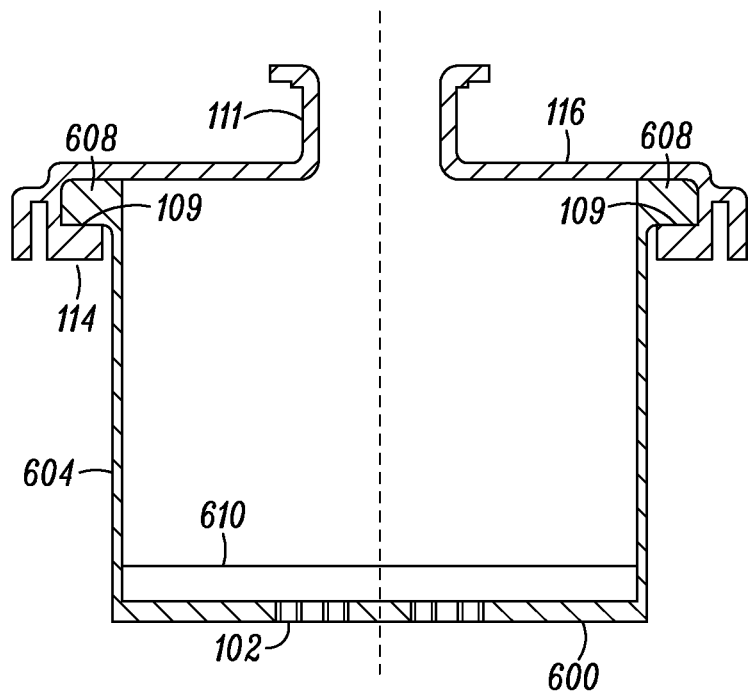
FIG. 6 illustrates the side view of an exemplary fluid reservoir with the anti-vibration baffle placed in the upside down position in relation to the fluid reservoir.

FIG. 6 illustrates an exemplary application of an anti-vibration baffle 600 which is mounted to the underside of the top cover 116 of the fluid reservoir 108. As depicted, the baffle 600 includes suspension members 604 that allows the mounting of the baffle 600 to the top cover 116 from below. Accordingly, the suspension members 604 of the baffle 600 would have additional snapping or mounting fixtures 608 that would function as the fastening means to the underside of the top cover 116. As shown, the mounting fixtures 608 may be inserted into receiving fixtures 109 or inserts disposed on the underside of the reservoir's vented top cover 116, thereby enabling positive fastening. This arrangement allows baffle 600 to be suspended immediately above the surface of the fluid without the need for any fastening on the sidewalls of the reservoir 108. Further, such a mechanism facilitates easy assembly and disassembly and allows the baffle 600 to be removed along with the top cover 116 of the fluid reservoir 108 during maintenance and repairs.

Mounting fixtures 608 may be configured in general cases to be not more than 5 mm in width. This dimension can vary, however, depending upon the number of support legs incorporated with the baffle 600 or with the size of the fluid reservoir 108.

It should be noted that this description does not set out specific details of the system, materials, design, or method of manufacture of the various components. Those skilled in the art are familiar with such details, and unless departures from those techniques are set out, techniques, designs, and materials known in the art should be employed. Those in the art are capable of choosing suitable manufacturing and design details.

The terminology used herein describes particular embodiments only and it's not intended to be limiting of the disclosure. It will be appreciated that several of the disclosed and other features and functions, or alternatives thereof, may be desirably combined into many other different systems or applications. Various presently unforeseen or unanticipated alternatives, modifications, variations, changes or improvements therein may be subsequently made by those skilled in the art, which are also intended to be encompassed by the following claims.

The invention claimed is:

1. An anti-vibration fluid reservoir system comprising:
an anti-vibration baffle disk disposed within the fluid reservoir, the disk including:
suspension members extending upwards from the disk, each suspension member including a mounting fixture at its tip remote from the disk, the suspension members being sized to position the baffle disk substantially at the fill line of the fluid reservoir, separating the air volume from the fluid volume;
a plurality of apertures formed in the disk; and
a reservoir cover, adapted to enclose the fluid reservoir, including receiving fixtures adapted to receive each suspension member mounting fixture.

2. The system of claim 1, wherein the baffle includes a lip structure configured around the periphery.

* * * * *